(12) United States Patent
Takeuchi et al.

(10) Patent No.: US 6,992,840 B2
(45) Date of Patent: Jan. 31, 2006

(54) PHOTOGRAPHING LENS

(75) Inventors: Hotaka Takeuchi, Saitama (JP); Yoichi Ishikawa, Zama (JP); Yasuhiko Abe, Toda (JP)

(73) Assignee: Nidec Copal Corporation, Tokyo (JP)

( * ) Notice: Subject to any disclaimer, the term of this patent is extended or adjusted under 35 U.S.C. 154(b) by 5 days.

(21) Appl. No.: 10/746,905

(22) Filed: Dec. 24, 2003

(65) Prior Publication Data

US 2004/0179275 A1 Sep. 16, 2004

(30) Foreign Application Priority Data

Dec. 27, 2002 (JP) .............................. 2002-379401

(51) Int. Cl.
 G02B 9/12 (2006.01)
 G02B 13/18 (2006.01)
(52) U.S. Cl. ...................................... 359/791; 359/716
(58) Field of Classification Search ................ 359/791, 359/716
See application file for complete search history.

(56) References Cited

U.S. PATENT DOCUMENTS 6,476,982 B1 * 11/2002 Kawakami .................. 359/791

FOREIGN PATENT DOCUMENTS

| JP | 05-040220 A1 | 2/1993 |
| JP | 05-157962 A1 | 6/1993 |
| JP | 5-188284 | 7/1993 |
| JP | 2000-171697 A1 | 6/2000 |
| JP | 2001-133684 A1 | 5/2001 |
| JP | 2002-098888 A1 | 4/2002 |
| JP | 2002-162561 A1 | 6/2002 |

OTHER PUBLICATIONS

Patent Abstracts of Japan for JP2002-162561 published on Jun. 7, 2002.
Patent Abstracts of Japan for JP2002-098888 published on Apr. 5, 2002.
Patent Abstracts of Japan for JP2001-133684 published on May 18, 2001.
Patent Abstracts of Japan for JP2000-171697 published on Jun. 23, 2000.
Patent Abstracts of Japan for JP05-157962 published on Jun. 25, 1993.
Patent Abstracts of Japan for JP05-040220 published on Feb. 19, 1993.

* cited by examiner

*Primary Examiner*—Scott J. Sugarman
(74) *Attorney, Agent, or Firm*—Darby & Darby

(57) ABSTRACT

A photographing lens includes an aperture stop having a predetermined aperture, a first lens having a positive refractive power and a convex surface facing the object side, a second lens having a positive refractive power and aspherical surfaces on both sides, the object-side aspherical surface being concave, and a third lens having a negative refractive power and aspherical surfaces on both sides, the object side surface being convex. The aperture stop and the first, second, and third lenses are arranged in order from the object side toward the image-plane side. With such a three-unit, three element lens configuration, a proper back focus is ensured, aberrations are properly corrected, and the total lens length and thickness of the photographing lens are reduced. The photographing lens can be suitably applied to high-resolution image pickup devices with a million pixels or more.

19 Claims, 6 Drawing Sheets

PHOTOGRAPHING LENS

BACKGROUND OF THE INVENTION

1. Field of the Invention

The present invention relates to a photographing lens for use in mobile telephones with cameras, such as digital still cameras or video cameras that have an image-pickup device, such as a CCD, and that are provided in devices such as portable telephones, personal digital assistants (PDAs), and portable personal computers.

2. Description of the Related Art

A conventional photographing lens is included in an image pickup device, such as a CCD, in order to take moving images, for example, as in surveillance cameras. Surveillance cameras are mainly used to take moving images, and the number of pixels of an image pickup device used therein is relatively small. Therefore, the surveillance cameras do not need a lens system having a high optical performance.

It has been pointed out that the quality of images taken by image pickup devices used in conventional surveillance cameras, video cameras, and the like is lower than in silver-halide film cameras. However, with recent advances in the field of image pickup devices, the image quality has approached that of the silver-halide film cameras. In addition, the image pickup devices have achieved a smaller size and higher resolution. These advances create a strong demand for a photographing lens included in cameras such as digital still cameras to have high performance and be small, thin, and inexpensive.

Photographing lenses used in devices such as portable telephones and PDAs include about one to three lens elements, and are quite small and thin. However, since photographing lenses are provided for relatively low-resolution image pickup devices with approximately 100,000 pixels to 350,000 pixels, they cannot provide images of satisfactory quality.

Conventional image pickup devices such as CCDs have microlenses at the front surface thereof in order to efficiently use light. For this reason, when the incident angle is excessively wide, light does not enter the image pickup devices because vignetting occurs. Accordingly, photographing lenses are generally included in these conventional image pickup devices, in which the exit pupil is disposed at a sufficient distance from the image plane, and telecentricity is enhanced by reducing the incident angle of light on the image pickup devices, that is, the exit angle (for example, see Japanese Unexamined Patent Application Publication Nos. 2000-171697, 2001-133684, 2002-98888, 2002-162561, Hei 05-40220, Hei 05-157962, and Hei 05-188284).

With recent advances in image pickup technology, there has been a demand for photographing lenses that are smaller, thinner, and less expensive, and that have higher resolution. However, the total lengths of the conventional photographing lenses are relatively long, in order to enhance the telecentricity. This hinders the thickness reduction.

In conventional image pickup devices, photographing lenses cannot be thin (the total length of the lens systems cannot be short) because of the limit of the light exit angle. However, the exit angle of light can be reduced to approximately 20° by suitably designing microlenses. Therefore, thinner photographing lenses suited to image pickup devices having such microlenses have been in demand.

SUMMARY OF THE INVENTION

The present invention has been made in view of the above problems, and an object of the present invention is to provide a small, thin, light, low-cost, and high-performance photographing lens that has a simple lens configuration, that prevents vignetting, and that can be included in an image pickup device having a high resolution of a million pixels or more mounted in a mobile telephones with a camera, such as a digital still camera or a digital video camera used in a device such as a portable telephone or a personal digital assistant, by properly determining the position of aspherical surfaces.

In order to achieve the above object, according to one aspect, the present invention comprises a photographing lens including an aperture stop having a predetermined aperture, a first lens having a positive refractive power and having a convex surface facing toward an object side, a second lens having a positive refractive power and having a concave surface facing toward the object side, and a third lens having a negative refractive power and having a convex surface facing toward the object side, wherein the aperture stop, the first lens, the second lens, and the third lens are arranged in that order from the object side toward an image-plane side.

The photographing lens has a three-unit, three-element configuration in which the aperture stop is disposed at the front end, the first and second lenses have a positive refractive power, and the third lens has a negative refractive power. Therefore, the photographing lens has a short total length; that is, it is thin while ensuring a proper back focus.

Preferably, each of the second and third lenses has aspherical surfaces on both the object side and the image-plane side.

In this case, it is possible to effectively overcome the problems of the difficulty of correcting aberrations and the increase of the exit angle as total length and size of the lens system decrease. Moreover, the photographing lens can be included in a high-resolution image pickup device, the exit angle of light is reduced to 24° or less, and aberrations are corrected properly.

Preferably, the third lens has an aspherical surface on the image-plane side, and has an inflection point on the aspherical surface.

Since the inflection point at which the concave shape changes to the convex shape is provided between the center and the radial periphery and within an effective area of the aspherical surface, aberrations, particularly astigmatism and distortion, can be properly corrected, and the exit angle can be reduced.

Preferably, the second lens has an aspherical surface on the object side, and the refractive power of the second lens decreases toward the periphery.

This allows aberrations, particularly astigmatism and coma aberration, to be corrected easily and properly.

Preferably, the second lens and the third lens are composed of a resin material.

In this case, the manufacturing cost can be reduced, and the weight can also be reduced. Moreover, since the lenses are formed by injection molding with resin, a complicated shape, such as a curved surface having an inflection point, can be produced easily.

Preferably, the following condition is satisfied:

$$TL/f < 1.6 \quad (1)$$

where f represents the total focal length of the lens system, and TL represents the total length of the lens system from the front side of the aperture stop on the object side to an image plane on which an image of an object is formed.

By thus determining the relationship between the focal length and the total length of the photographing lens as in condition (1), the size and thickness of the photographing lens can be reduced easily.

Preferably, the following condition is satisfied:

$$v1 > 45 \quad (2)$$

where v 1 represents the Abbe number of the first lens.

By thus setting the Abbe number of the first lens as in condition (2), axial chromatic aberration and lateral chromatic aberration particularly, can be corrected properly.

Preferably, the following conditions are satisfied:

$$0.7 < |R4|/|R5| < 2 \quad (3)$$

$$1 < R6/R7 < 4 \quad (4)$$

where R4 represents the radius of curvature of the object-side surface of the second lens, R5 represents the radius of curvature of an image-plane side surface of the second lens, R6 represents the radius of curvature of the object-side surface of the third lens, and R7 represents the radius of curvature of an image-plane side surface of the third lens.

By thus setting the radii of curvature of the second lens as in condition (3) and the third lens as in condition (4), a proper back focus can be ensured, aberrations, particularly astigmatism and distortion, can be properly corrected, and good optical characteristics can be achieved.

Preferably, the following condition is satisfied:

$$D5/f < 0.15 \quad (5)$$

where D5 represents the distance in the optical-axis direction between the second lens and the third lens, and f represents the focal length of the lens system.

By thus setting the distance between the second lens and the third lens as in condition (5), aberrations, particularly astigmatism and distortion, can be corrected properly.

Preferably, the following condition is satisfied:

$$0.8 < D4/D6 < 1.3 \quad (6)$$

where D4 represents the thickness of the second lens in the optical-axis direction, and D6 represents the thickness of the third lens in the optical-axis direction.

By thus setting the thicknesses of the second lens and the third lens as in condition (6), a proper back focus can be ensured, aberrations, particularly astigmatism, can be properly corrected, and good optical characteristics can be achieved.

Further objects, features and advantages of the present invention will become apparent from the following description of the preferred embodiments with reference to the attached drawings.

BRIEF DESCRIPTION OF THE DRAWINGS

The foregoing and other features of the present invention will be more readily apparent from the following detailed description and drawings of the illustrative embodiments of the invention wherein like reference numbers refer to similar elements and in which.

DESCRIPTION OF THE PREFERRED EMBODIMENTS

Preferred embodiments of the present invention will be described below with reference to the attached drawings.

Figure 1:
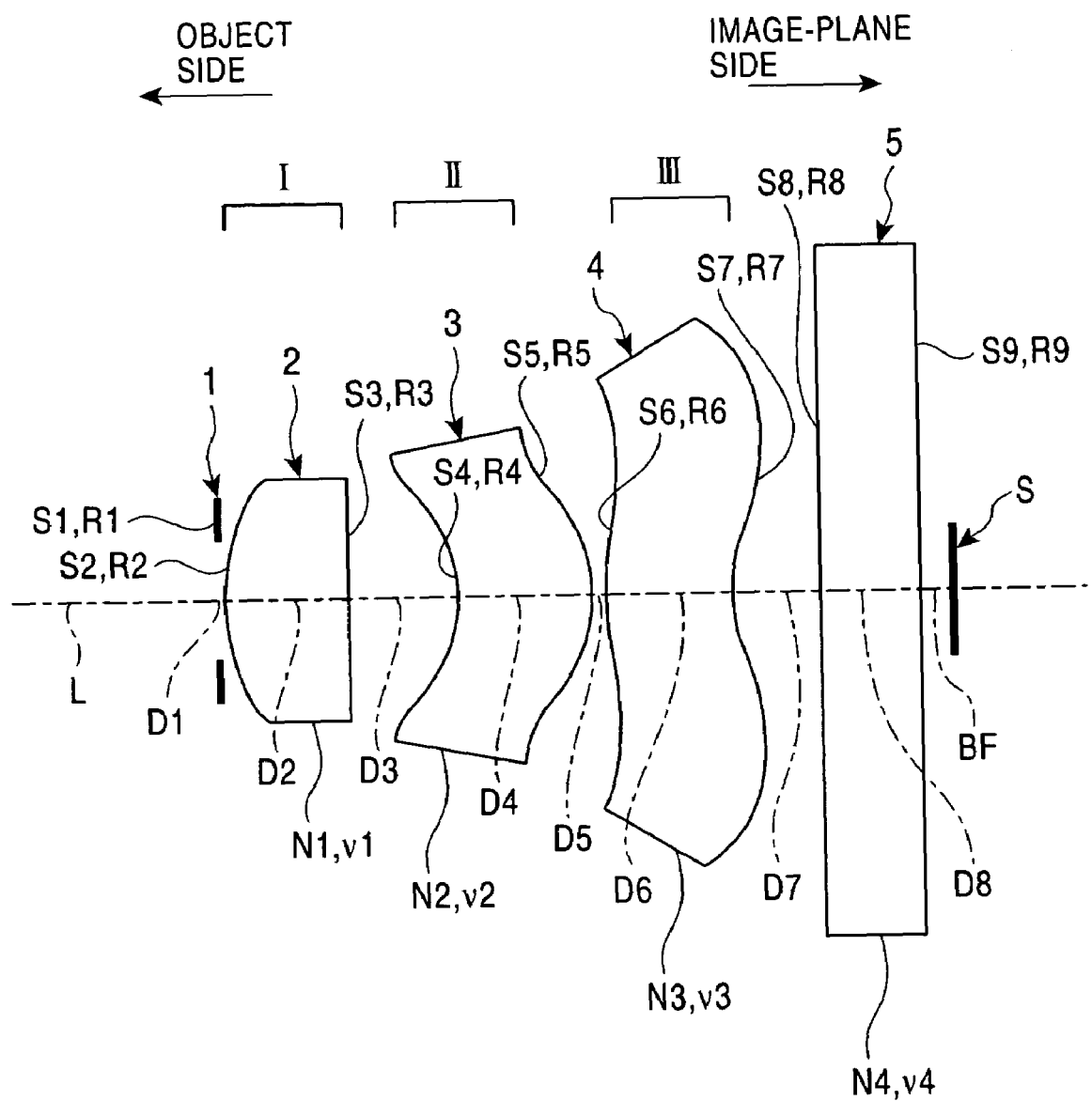
FIG. 1 is a structural view of a photographing lens according to an embodiment of the present invention.

FIG. 1 shows the basic configuration of a photographing lens according to an embodiment of the present invention. In the photographing lens of the embodiment of the present invention, an aperture stop 1 having a predetermined aperture, a first lens unit I, a second lens unit II, and a third lens unit III are arranged in order from the object side toward the image-plane side, as shown in FIG. 1.

The first lens unit I is composed of a first lens 2 that has a positive refractive power and includes a convex surface facing toward the object side. The second lens unit II is composed of a second lens 3 that has a positive refractive power and includes a concave surface facing toward the object side. The third lens unit III is composed of a third lens 4 that has a negative refractive power and includes a convex surface facing toward the object side.

In this configuration, a glass filter 5 made of a parallel plate and serving as an infrared cut filter or a low-pass filter is disposed offset from the third lens 4 toward the image-plane side. An image plane S of a CCD or the like is disposed behind the glass filter 5.

As shown in FIG. 1, surfaces of the aperture stop 1, the first to third lenses 2 to 4, and the glass filter 5 are designated by Si (i=1 to 9), the radii of curvature of the surfaces Si are designated by Ri (i=1 to 9), the refractive indices and the Abbe numbers of the first to third lenses 2 to 4 with respect to the d-ray are designated by Ni (i=1 to 3) and vi (i=1 to 3), and the refractive index and the Abbe number of the glass filter 5 with respect to the d-ray are designated by N4 and v4. The distances (thicknesses, air distances) between the elements from the aperture stop 1 to the glass filter 5 in the optical-axis direction L are designated by Di (i=1 to 8), and the back focus is designated as BF.

When it is assumed that f represents the focal length of the whole lens system and TL represents the distance between the object-side front surface S1 of the aperture stop 1 and the image plane S on which an image of the object is focused (the back focus is expressed as air conversion), the following condition (1) is satisfied:

$$TL/f < 1.6 \quad (1)$$

Condition (1) defines the proper ratio of the length in the optical-axis direction and the focal length of the whole lens system in order to reduce the thickness of the lens system. By setting TL/f to be less than 1.6, the size and thickness of the lens system can be reduced easily.

The first lens 2 is composed of a glass material, and the Abbe number v1 thereof satisfies the following condition (2):

$$v1 > 45 \quad (2)$$

Condition (2) defines the proper Abbe number of the first lens 2. When condition (2) is not satisfied, particularly, axial chromatic aberration and lateral chromatic aberration increase. Therefore, axial chromatic aberration and lateral chromatic aberration can be properly corrected by satisfying condition (2).

The second lens 3 is disposed with a concave surface S4 facing toward the object side and with a convex surface S5 facing toward the image-plane side, and is composed of a resin material. Both the surfaces S4 and S5 on the object side and the image-plane side are aspherical. The object-side aspherical surface S4 is formed so that the refractive power decreases toward the periphery.

As the lens length and size decrease, the correction of aberrations tends to be quite difficult, and the exit angle tends to be quite wide. However, aberrations can be properly corrected while ensuring the proper back focus by making both the surfaces S4 and S5 of the second lens 3 aspherical. In particular, astigmatism and coma aberration can be easily corrected by reducing the refractive power in the peripheral portion.

The third lens 4 is disposed with a convex surface S6 facing toward the object side and with a concave surface S7 facing toward the image-plane side, and is composed of a resin material. Both the surfaces S6 and S7 on the object side and the image-plane side are aspherical. The aspherical surface S7 on the image-plane side has an inflection point, at which the concave shape changes to the convex shape, between the center and the outer radial portion.

In this case, as the lens length and size decrease, correction of aberrations tends to be difficult, and the exit angle tends to be wide, in a manner similar to that above. However, aberrations can be properly corrected while ensuring the proper back focus by making both the surfaces S6 and S7 of the third lens 4 aspherical.

In particular, by providing an inflection point, astigmatism and distortion can be easily corrected, the exit angle can be reduced, and the image plane at the center and the image plane on the periphery can be easily aligned with each other.

The aspherical shapes of the second lens 3 and the third lens 4 are defined by the following expression:

$$Z = Cy^2/[1+(1-\epsilon C^2 y^2)^{1/2}] + Dy^4 + Ey^6 + Fy^8 + Gy^{10} +$$

where Z represents the distance between the tangent plane to the top of the aspherical surface and a point on the aspherical surface at the height y from the optical axis L, y represents the height from the optical axis L, C represents the curvature (1/R) at the top of the aspherical surface, $\epsilon$ represents the conic constant, and D, E, F, G, and H represent aspherical coefficients.

Furthermore, the radii of curvature R4 and R5 of the second lens 3 and the radii of curvature R6 and R7 of the third lens 4 satisfy the following conditions (3) and (4):

$$0.7 < |R4|/|R5| < 2 \quad (3)$$

$$1 < R6/R7 < 4 \quad (4)$$

Conditions (3) and (4) define the proper ratios of the radii of curvature in order to achieve good optical characteristics of the second lens 3 and the third lens 4. When conditions (3) and (4) are not satisfied, it is difficult to ensure a proper back focus and to correct aberrations, particularly astigmatism and distortion. Therefore, by satisfying these conditions, a proper back focus can be ensured, aberrations can be properly corrected, and satisfactory optical characteristics can be obtained.

The distance D5 between the second lens 3 and the third lens 4 in the optical-axis direction and the focal length f of the whole lens system satisfy the following condition (5):

$$D5/f < 0.15 \quad (5)$$

Condition (5) defines the proper distance between the second lens 3 and the third lens 4 in the optical-axis direction. When condition (5) is not satisfied, the distance to the exit pupil is increased, and the incident angle of light on an image pickup is decreased. However, the total length of the lens system is increased, and the outer diameter of the third lens 4 is increased. Moreover, it is difficult, particularly, to correct astigmatism and distortion. Therefore, the thickness and size of the lens system can be reduced and aberrations, particularly astigmatism and distortion, can be properly corrected by satisfying condition (5).

The thickness D4 of the second lens 3 and the thickness D6 of the third lens 4 satisfy the following condition (6):

$$0.8 < D4/D6 < 1.3 \quad (6)$$

Condition (6) defines the proper ratio of the thicknesses of the second lens 3 and the third lens 4 on the optical axis. When condition (6) is not satisfied, it is difficult to ensure a proper back focus and to correct aberrations, particularly astigmatism. Therefore, by satisfying condition (6), a proper back focus can be ensured, aberrations, particularly astigmatism, can be properly corrected, and good optical characteristics can be achieved.

Figure 2:
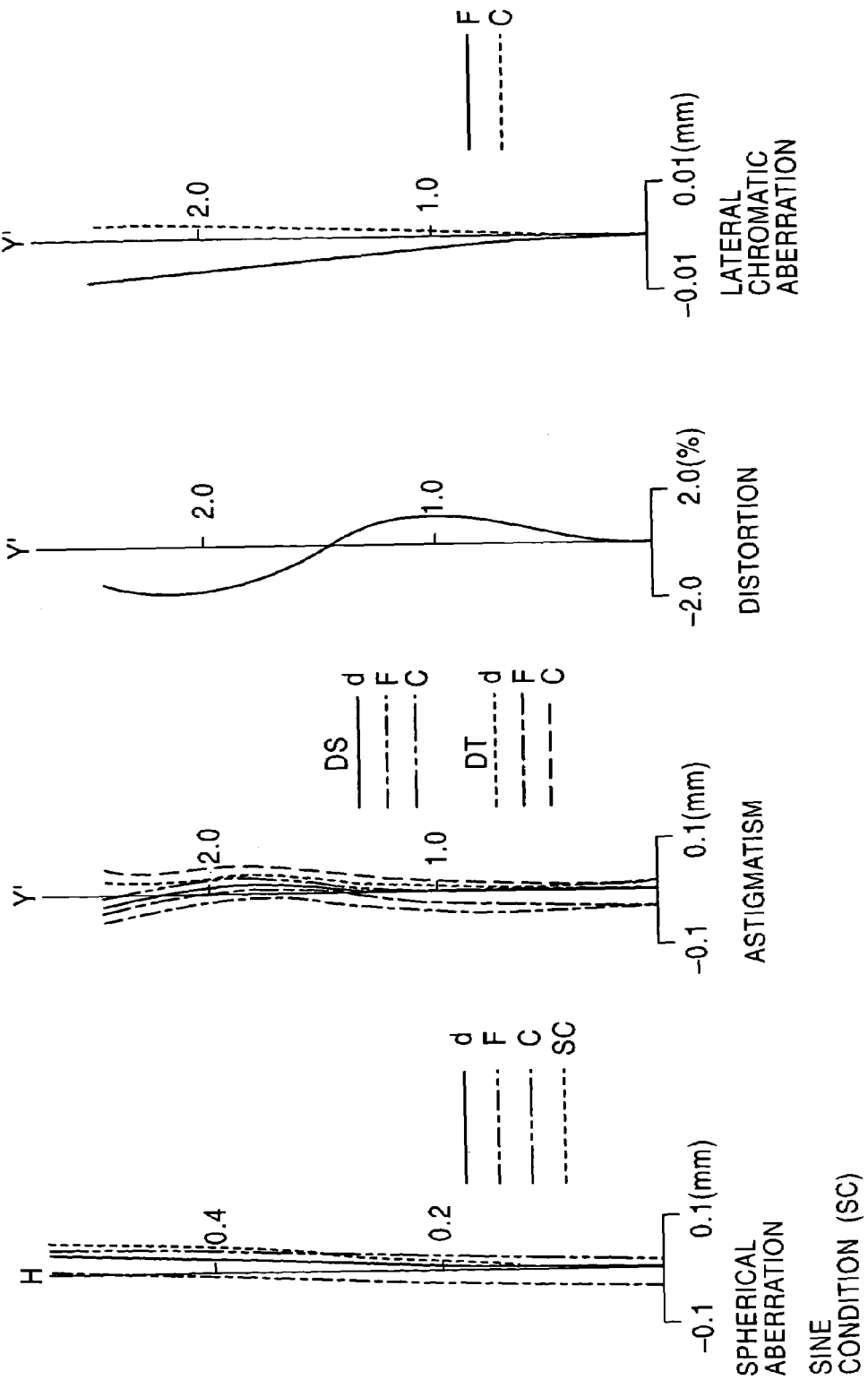
FIG. 2 are aberration charts showing spherical aberration, astigmatism, distortion, and lateral chromatic aberration in the photographing lens of the embodiment of FIG. 1.

A description will now be given of an example obtained by applying specific values to the above embodiment of FIG. 1. In this example, specifications are shown in Table 1, various numerical data (setting values) are shown in Table 2, and numerical data on the aspherical surfaces are shown in Table 3. FIG. 2 shows spherical aberration, astigmatism, distortion, and lateral chromatic aberration in this example. In FIG. 2, H represents the incident height, Y' represents the height of the image, d represents aberration with respect to the d-ray, F represents aberration with respect to the F-ray, c represents aberration with respect to the c-ray, SC represents the offence against the sine condition, DS represents aberration on the sagittal plane, and DT represents aberration on the meridional plane.

TABLE 1

| Object Distance | ∞ | Total Length of Lens System (Between Front Surface of Aperture Stop and Rear End of Third Lens) | 4.14 mm |
|---|---|---|---|
| Total Focal Length f of Lens System | 4.35 mm | Back Focus (Air Conversion) | 1.58 mm |
| F-number | 3.95 | Total Length of Lens System (Between Front Surface of Aperture Stop and Image Plane; Including Glass Filter) | 5.97 mm |
| Position of Exit Pupil | −4.41 mm | Total Length TL of Lens System (Between Front Surface of Aperture Stop and Image Plane; without Glass Filter) | 5.72 mm |

TABLE 1-continued

| Exit Angle of Outermost Beam | −18.9° | Angle of View (2 ω) | 60.4° |
|---|---|---|---|

TABLE 2

| Surface | Radius of Curvature (mm) | | Distance (mm) | Refractive Index (d line) | | Abbe Number |
|---|---|---|---|---|---|---|
| S1 | R1 | ∞ (Aperture Stop) | | | | |
| | | | D1 | 0.050 | | |
| S2 | R2 | 2.100 | D2 | 1.013 | N1 1.49700 v1 | 81.6 |
| S3 | R3 | −31.041 | | | | |
| | | | D3 | 0.840 | | |
| S4* | R4 | −1.307 | D4 | 1.090 | N2 1.50914 v2 | 56.4 |
| S5* | R5 | −1.415 | | | | |
| | | | D5 | 0.100 | | |
| S6* | R6 | 2.620 | D6 | 1.045 | N3 1.50914 v3 | 56.4 |
| S7* | R7 | 1.573 | | | | |
| | | | D7 | 0.783 | | |
| S8 | | ∞ | D8 | 0.750 | N4 1.51680 v4 | 64.2 |
| S9 | | ∞ | | | | |
| | | | BF | 0.30 | | |

*aspherical

TABLE 3

| Surface | Aspherical Surface Coefficient | |
|---|---|---|
| S4 | ε | −1.6013550 |
| | D | −0.1373080 |
| | E | 0.9609190 × 10⁻¹ |
| | F | 0.2122470 × 10⁻¹ |
| | G | −0.4222570 × 10⁻¹ |
| | H | 0.1276420 × 10⁻¹ |
| S5 | ε | 0.4005340 |
| | D | −0.7267790 × 10⁻¹ |
| | E | 0.6589860 × 10⁻¹ |
| | F | 0.7947910 × 10⁻² |
| | G | −0.4892700 × 10⁻² |
| | H | 0.3645610 × 10⁻³ |
| S6 | ε | −2.8115860 |
| | D | −0.1355510 |
| | E | 0.4805600 × 10⁻¹ |
| | F | −0.6459320 × 10⁻² |
| | G | −0.1636780 × 10⁻³ |
| | H | 0.5901350 × 10⁻⁴ |
| S7 | ε | −0.3867960 |
| | D | −0.1251790 |

TABLE 3-continued

| Surface | Aspherical Surface Coefficient | |
|---|---|---|
| | E | 0.2677310 × 10⁻¹ |
| | F | −0.4085650 × 10⁻² |
| | G | 0.4376590 × 10⁻³ |
| | H | −0.2920160 × 10⁻⁴ |

All conditions (1) to (6) are satisfied as follows:
(1) TL/f = 1.31 (<1.6)
(2) v1 = 81.6 (>45)
(3) |R4|/|R5| = 0.92 (0.7 < 0.92 < 2)
(4) R6/R7 = 1.67 (1 < 1.67 < 4)
(5) D5/f = 0.02 (<0.15)
(6) D4/D6 = 1.04 (0.8 < 1.04 < 1.3)

In the above example, the total lens length, excluding the back focus, is 4.14 mm, the back focus (air conversion) is 1.58 mm, the exit angle of the outermost beam is |−18.9°|, the F-number is 3.95, and the angle of view is 60.4°. Therefore, it is possible to achieve a thin (short in the optical-axis direction) and high-performance photographing lens that is properly corrected for aberrations and that is suitably used for a high-resolution image pickup device.

Figure 3:
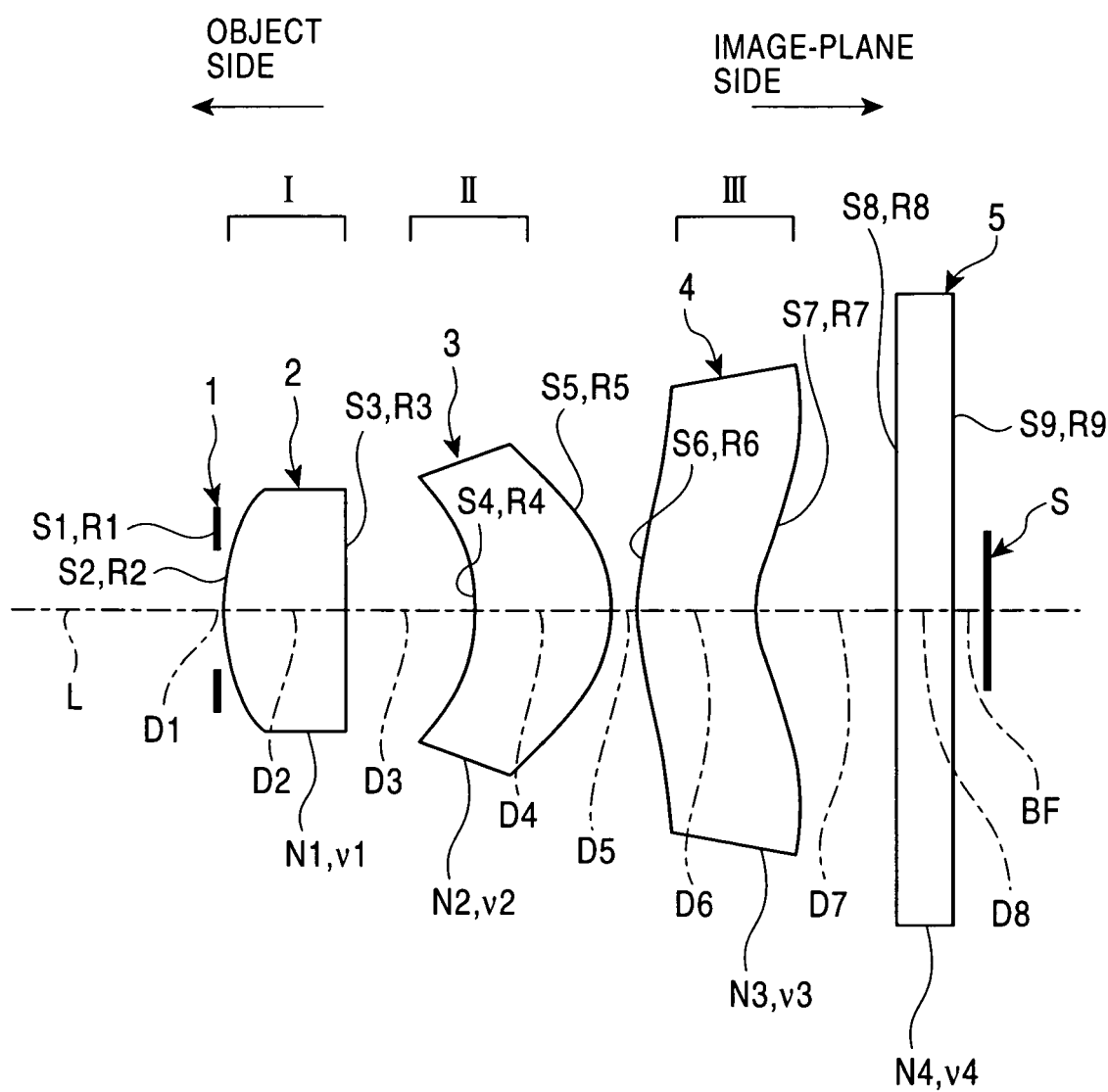
FIG. 3 is a structural view of a photographing lens according to another embodiment of the present invention.

FIG. 3 shows the basic configuration of a photographing lens according to another embodiment of the present invention. The photographing lens of the embodiment of FIG. 3 has a configuration similar to that in the above embodiment of FIG. 1 except for the specifications of lenses.

Figure 4:
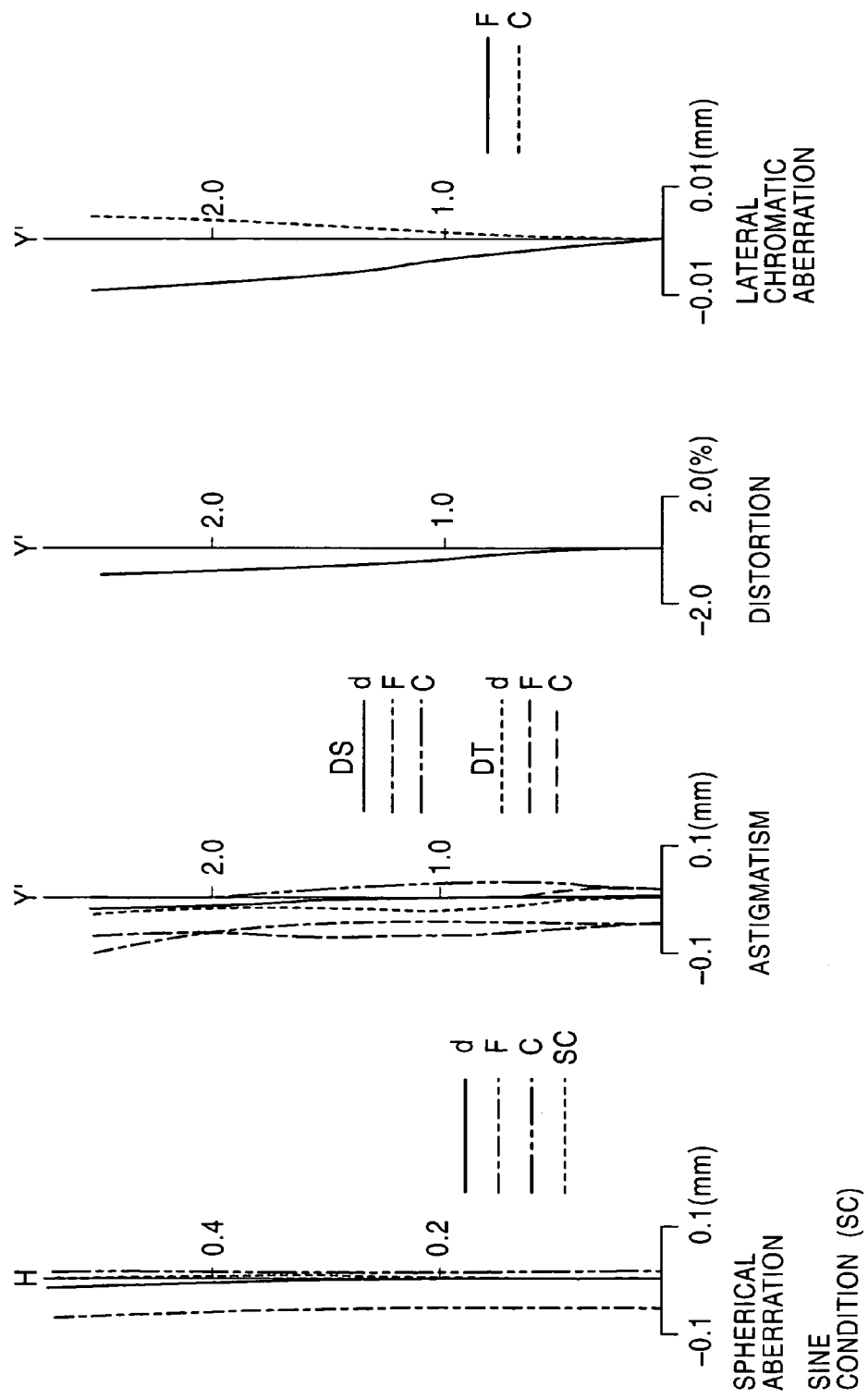
FIG. 4 are aberration charts showing spherical aberration, astigmatism, distortion, and lateral chromatic aberration in the photographing lens of the embodiment of FIG. 3.

A description will be given of an example obtained by applying specific values to the above embodiment. In this example, specifications are shown in Table 4, various numerical data (setting values) are shown in Table 5, and numerical data on the aspherical surfaces are shown in Table 6. FIG. 4 shows spherical aberration, astigmatism, distortion, and lateral chromatic aberration in this example. In FIG. 4, H represents the incident height, Y' represents the height of the image, d represents aberration with respect to the d-ray, F represents aberration with respect to the F-ray, c represents aberration with respect to the c-ray, SC represents the offence against the sine condition, DS represents aberration on the sagittal plane, and DT represents aberration on the meridional plane.

TABLE 4

| Object Distance | ∞ | Total Length of Lens System (Between Front Surface of Aperture Stop and Rear End of Third Lens) | 4.40 mm |
|---|---|---|---|
| Total Focal Length f of Lens System | 4.32 mm | Back Focus (Air Conversion) | 1.79 mm |
| F-number | 4.00 | Total Length of Lens System (Between Front Surface of Aperture Stop and Image Plane; Including Glass Filter) | 6.36 mm |
| Position of Exit Pupil | −5.30 mm | Total Length TL of Lens System (Between Front Surface of Aperture Stop and Image Plane; without Glass Filter) | 6.19 mm |
| Exit Angle of Outermost Beam | −17.8° | Angle of View (2 ω) | 60.6° |

TABLE 5

| Surface | Radius of Curvature (mm) | | Distance (mm) | | Refractive Index (d line) | | Abbe Number |
|---|---|---|---|---|---|---|---|
| S1 | R1 | ∞ | | | | | |
| | (Aperture Stop) | | | | | | |
| | | | D1 | 0.000 | | | |
| S2 | R2 | 3.146 | D2 | 1.000 | N1 | 1.71300 | ν1 53.9 |
| S3 | R3 | 12.111 | | | | | |
| | | | D3 | 1.100 | | | |
| S4* | R4 | −1.550 | D4 | 1.100 | N2 | 1.50914 | ν2 56.4 |
| S5* | R5 | −1.345 | | | | | |
| | | | D5 | 0.200 | | | |
| S6* | R6 | 2.182 | D6 | 1.000 | N3 | 1.50914 | ν3 56.4 |
| S7* | R7 | 1.450 | | | | | |
| | | | D7 | 1.158 | | | |
| S8 | | ∞ | D8 | 0.500 | N4 | 1.51680 | ν4 64.2 |
| S9 | | ∞ | | | | | |
| | | | BF | 0.30 | | | |

*aspherical

TABLE 6

| Surface | Aspherical Surface Coefficient | |
|---|---|---|
| S4 | ε | −5.2121236 |
| | D | −0.1421075 |
| | E | $0.4925830 \times 10^{-1}$ |
| | F | $-0.1896358 \times 10^{-2}$ |
| | G | $-0.1048479 \times 10^{-2}$ |
| | H | $0.1270435 \times 10^{-4}$ |
| S5 | ε | 0.3880839 |
| | D | $-0.9013852 \times 10^{-2}$ |
| | E | $0.9477626 \times 10^{-2}$ |
| | F | $0.4045367 \times 10^{-2}$ |
| | G | $-0.4583173 \times 10^{-3}$ |
| | H | $0.1708697 \times 10^{-4}$ |
| S6 | ε | −7.1022434 |
| | D | $-0.5224621 \times 10^{-1}$ |
| | E | $0.2471356 \times 10^{-1}$ |
| | F | $-0.5362617 \times 10^{-2}$ |
| | G | $0.3412775 \times 10^{-3}$ |
| | H | $0.1368477 \times 10^{-4}$ |

TABLE 6-continued

| Surface | Aspherical Surface Coefficient | |
|---|---|---|
| S7 | ε | −3.9418225 |
| | D | $-0.4667482 \times 10^{-1}$ |
| | E | $0.1469927 \times 10^{-1}$ |
| | F | $-0.2858500 \times 10^{-2}$ |
| | G | $0.2157729 \times 10^{-3}$ |
| | H | $-0.2586001 \times 10^{-5}$ |

All conditions (1) to (6) are satisfied as follows:
(1) TL/f = 1.43 (<1.6)
(2) ν1 = 53.9 (>45)
(3) |R4|/|R5| = 1.15 (0.7 < 1.15 < 2)
(4) R6/R7 = 1.50 (1 < 1.50 < 4)
(5) D5/f = 0.05 (<0.15)
(6) D4/D6 = 1.1 (0.8 < 1.1 < 1.3)

In the above example, the total lens length, excluding the back focus, is 4.40 mm, the back focus (air conversion) is 1.79 mm, the exit angle of the outermost beam is |−17.8°|, the F-number is 4.00, and the angle of view is 60.6°. Therefore, it is possible to achieve a thin (short in the optical-axis direction) and high-performance photographing lens that is properly corrected for aberrations and that is suitably used for a high-resolution image pickup device.

Figure 5:
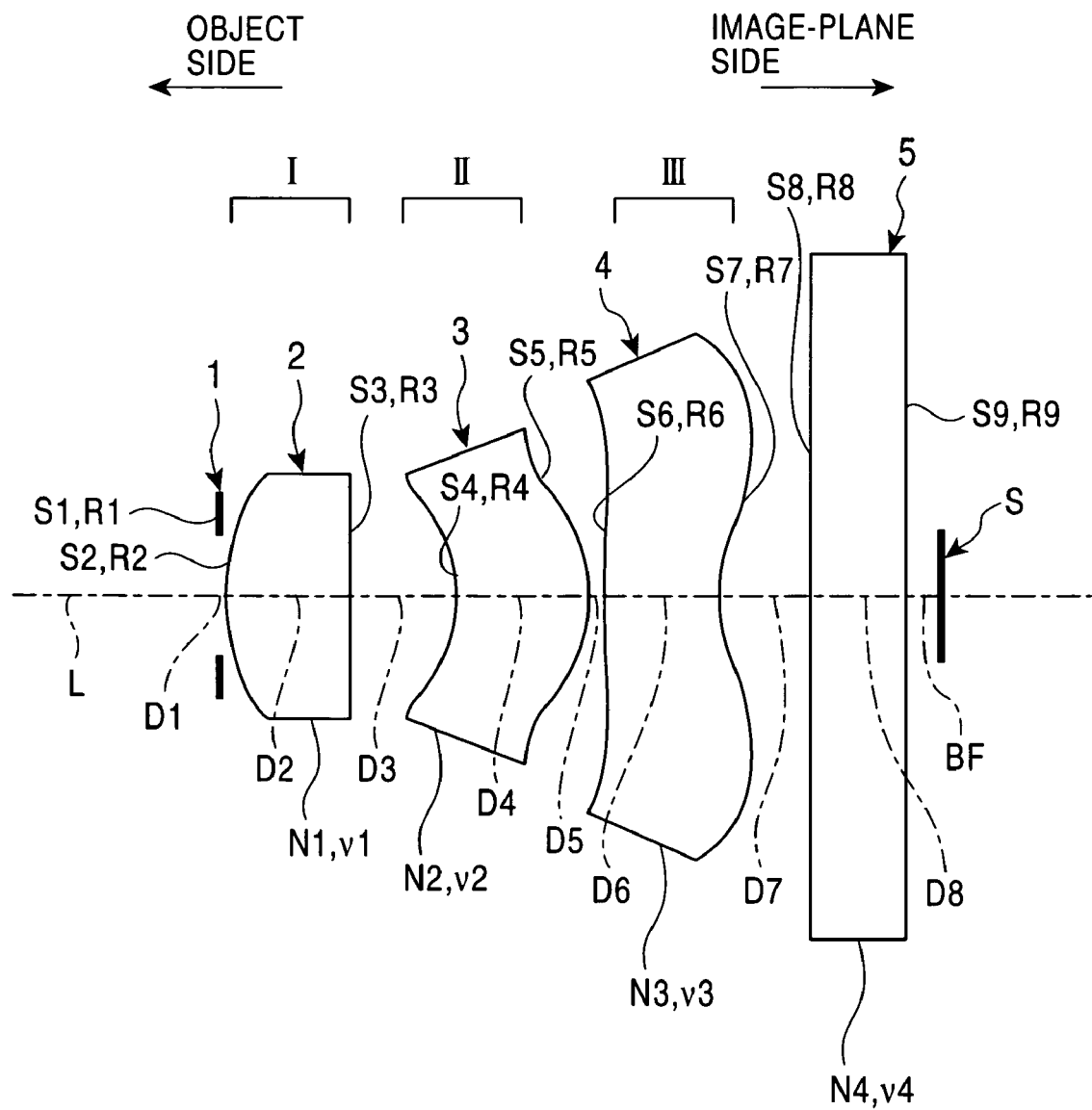
FIG. 5 is a structural view of a photographing lens according to a further embodiment of the present invention.

FIG. 5 shows the basic configuration of a photographing lens according to a further embodiment of the present invention. The photographing lens of this embodiment has a configuration similar to those in the above embodiments except for the specifications of lenses.

Figure 6:
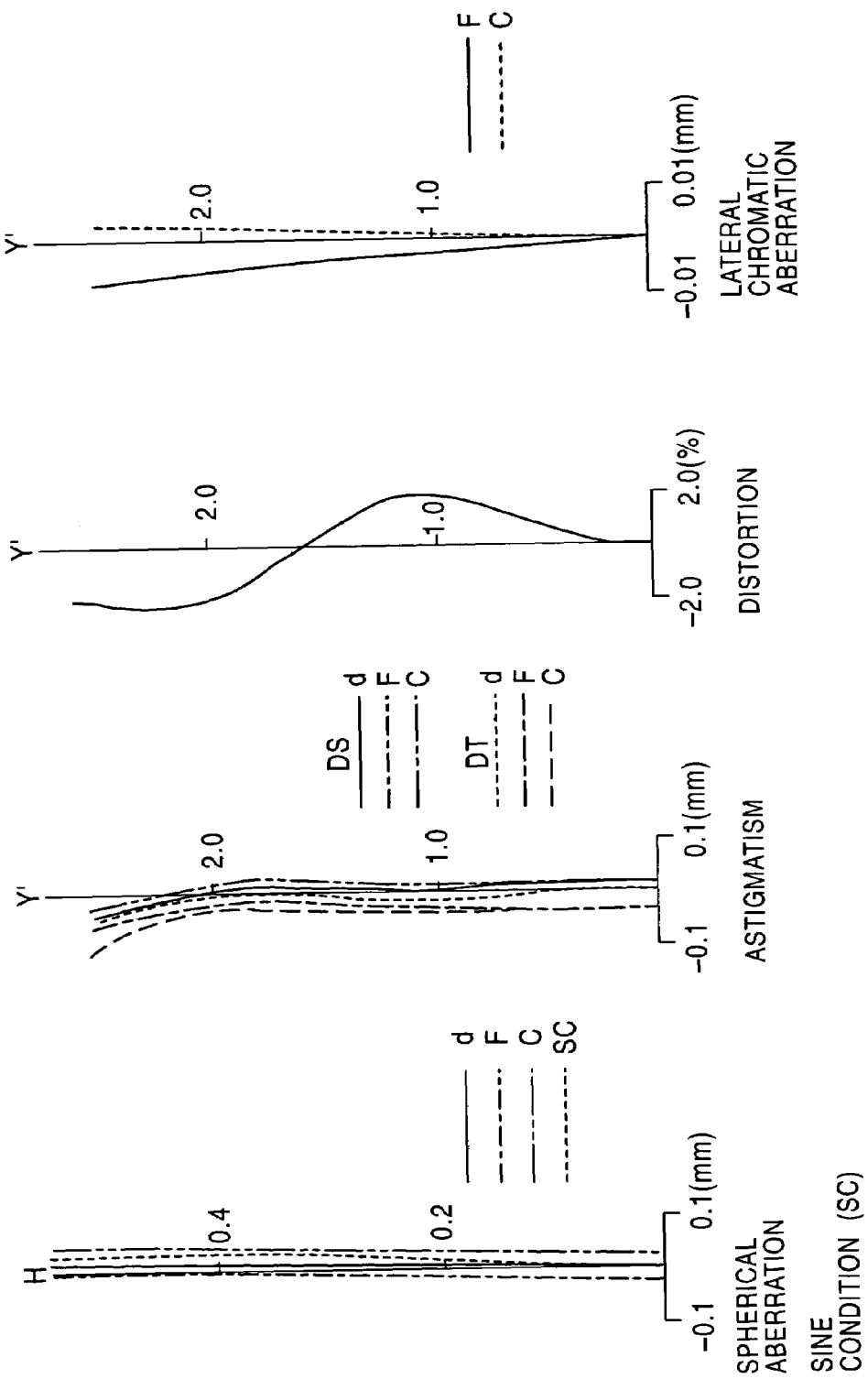
FIG. 6 are aberration charts showing spherical aberration, astigmatism, distortion, and lateral chromatic aberration in the photographing lens of the embodiment of FIG. 5.

An example obtained by applying specific values to the third embodiment will be described below. In this example, specifications are shown in Table 7, various numerical data (setting values) are shown in Table 8, and numerical data on the aspherical surfaces are shown in Table 9. FIG. 6 shows spherical aberration, astigmatism, distortion, and lateral chromatic aberration in this example. In FIG. 6, H represents the incident height, Y' represents the height of the image, d represents aberration with respect to the d-ray, F represents aberration with respect to the F-ray, c represents aberration with respect to the c-ray, SC represents the offence against the sine condition, DS represents aberration on the sagittal plane, and DT represents aberration on the meridional plane.

TABLE 7

| | | | |
|---|---|---|---|
| Object Distance | ∞ | Total Length of Lens System (Between Front Surface of Aperture Stop and Rear End of Third Lens) | 4.15 mm |
| Total Focal Length f of Lens System | 4.35 mm | Back Focus (Air Conversion) | 1.56 mm |
| F-number | 3.96 | Total Length of Lens System (Between Front Surface of Aperture Stop and Image Plane; Including Glass Filter) | 5.97 mm |
| Position of Exit Pupil | −4.35 mm | Total Length TL of Lens System (Between Front Surface of Aperture Stop and Image Plane; without Glass Filter) | 5.71 mm |
| Exit Angle of Outermost Beam | −18.9° | Angle of View (2 ω) | 60.8° |

TABLE 8

| Surface | Radius of Curvature (mm) | | Distance (mm) | Refractive Index (d line) | | Abbe Number |
|---|---|---|---|---|---|---|
| S1 | R1 | ∞ | | | | |
| | (Aperture Stop) | | | | | |
| | | | D1 | 0.100 | | |
| S2 | R2 | 2.100 | D2 | 1.032 | N1 | 1.49700 v1 | 81.6 |
| S3 | R3 | −22.790 | | | | |
| | | | D3 | 0.821 | | |
| S4* | R4 | −1.318 | D4 | 1.097 | N2 | 1.50914 v2 | 56.4 |
| S5* | R5 | −1.155 | | | | |
| | | | D5 | 0.100 | | |
| S6* | R6 | 4.766 | D6 | 1.000 | N3 | 1.50914 v3 | 56.4 |
| S7* | R7 | 1.546 | | | | |
| | | | D7 | 0.769 | | |
| S8 | | ∞ | D8 | 0.750 | N4 | 1.51680 v4 | 64.2 |
| S9 | | ∞ | | | | |
| | | | BF | 0.30 | | |

*aspherical

TABLE 9

| Surface | | Aspherical Surface Coefficient |
|---|---|---|
| S4 | ϵ | −0.670092 |
| | D | −0.1125650 |
| | E | 0.1230170 |
| | F | $0.1566500 \times 10^{-1}$ |
| | G | $-0.5996650 \times 10^{-1}$ |
| | H | $0.1961910 \times 10^{-1}$ |
| S5 | ϵ | 0.1765880 |
| | D | $-0.2461630 \times 10^{-1}$ |
| | E | $0.5475240 \times 10^{-1}$ |
| | F | $0.8936770 \times 10^{-2}$ |
| | G | $-0.3604610 \times 10^{-2}$ |
| | H | $-0.2623760 \times 10^{-3}$ |
| S6 | ϵ | −17.319785 |
| | D | $-0.9529140 \times 10^{-1}$ |
| | E | $0.3618380 \times 10^{-1}$ |
| | F | $-0.5356020 \times 10^{-2}$ |
| | G | $-0.7287330 \times 10^{-4}$ |
| | H | $0.4659120 \times 10^{-4}$ |
| S7 | ϵ | −1.1226510 |
| | D | −0.1108290 |
| | E | $0.2459010 \times 10^{-1}$ |
| | F | $-0.3897190 \times 10^{-2}$ |
| | G | $0.4121550 \times 10^{-3}$ |
| | H | $-0.2685440 \times 10^{-4}$ |

All conditions (1) to (6) are satisfied as follows:
(1) TL/f = 1.31 (<1.6)
(2) v1 = 81.6 (>45)
(3) |R4|/|R5| = 1.14 (0.7 < 1.14 < 2)
(4) R6/R7 = 3.08 (1 < 3.08 < 4)
(5) D5/f = 0.02 (<0.15)
(6) D4/D6 = 1.097 (0.8 < 1.097 < 1.3)

In the above example, the total lens length, excluding the back focus, is 4.15 mm, the back focus (air conversion) is 1.56 mm, the exit angle of the outermost beam is |−18.9°|, the F-number is 3.96, and the angle of view is 60.8°. Therefore, it is possible to achieve a thin (short in the optical-axis direction) and high-performance photographing lens that is properly corrected for aberrations and that is suitably used for a high-resolution image pickup device.

In the above-described photographing lens of the present invention having a simple three-unit, three-element configuration, the size, weight, and cost can be reduced, vignetting at the image pickup device is prevented, and aberrations can be properly corrected.

In particular, the exit angle of light is limited to 20° or less, the total length of the lens system (excluding the back focus) is limited to 4.5 mm or less while ensuring a proper back focus, and aberrations can be properly corrected. The photographing lens can be included in an image pickup device having a high resolution of a million pixels or more.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A photographing lens comprising:
an aperture stop having a predetermined aperture;
a first lens group consisting of a first lens having a positive refractive power and having a convex surface facing toward an object side;
a second lens group consisting of a second lens having a positive refractive power and having a concave surface facing toward the object side; and
a third lens group consisting of a third lens having a negative refractive power and having a convex surface facing toward the object side,
wherein the aperture stop, the first lens group, the second lens group, and the third lens group are arranged in order from the object side toward an image-plane side.

2. A photographing lens according to claim 1, wherein the second lens and the third lens have aspherical surfaces on both the object side and the image-plane side.

3. A photographing lens according to claim 1, wherein the third lens has an aspherical surface on the image-plane side, and has an inflection point on the aspherical surface.

4. A photographing lens according to claim 2, wherein the third lens has an inflection point on the aspherical surface on the image-plane side.

5. A photographing lens according to claim 1, wherein the second lens has an aspherical surface on the object side, and the refractive power of the second lens decreases toward the periphery.

6. A photographing lens according to claim 1, wherein the second lens and the third lens are composed of a resin material.

7. A photographing lens according to claim 1, wherein:

$TL/f < 1.6$ where f is a total focal length of the photographing lens, and TL is a total length of the photographing lens from a front of the aperture stop on the object side to an image plane on which an image of an object is focused.

8. A photographing lens according to claim 1, wherein:

$v1 > 45$ where v1 is an Abbe number of the first lens.

9. A photographing lens according to claim 1, wherein:

$0.7 < |R4|/|R5| < 2$ $1 < R6/R7 < 4$ where R4 is a radius of curvature of the object-side surface of the second lens, R5 is a radius of curvature of an image-plane side surface of the second lens, R6 is a radius of curvature of the object-side surface of the third lens, and R7 is a radius of curvature of an image-plane side surface of the third lens.

10. A photographing lens according to claim 1, wherein:

$$D5/f<0.15$$

where D5 is a distance in an optical-axis direction between the second lens and the third lens, and f is a total focal length of the photographing lens.

11. A photographing lens according to claim 1, wherein the following expression is satisfied:

$$0.8<D4/D6<1.3$$

where D4 is a thickness of the second lens in an optical-axis direction, and D6 is a thickness of the third lens in the optical-axis direction.

12. A photographing lens according to claim 2, wherein the refractive power of the second lens decreases toward the periphery.

13. A photographing lens according to claim 3, wherein the refractive power of the second lens decreases toward the periphery.

14. A photographing lens according to claim 4, wherein the refractive power of the second lens decreases toward the periphery.

15. A photographing lens according to claim 2, wherein the second lens and the third lens are composed of a resin material.

16. A photographing lens according to claim 3, wherein the second lens and the third lens are composed of a resin material.

17. A photographing lens according to claim 4, wherein the second lens and the third lens are composed of a resin material.

18. A photographing lens according to claim 5, wherein the second lens and the third lens are composed of a resin material.

19. A photographing lens comprising:
    an aperture stop having a predetermined aperture;
    a first lens group consisting essentially of a first lens having a positive refractive power and having a convex surface facing toward an object side;
    a second lens group consisting essentially of a second lens having a positive refractive power and having a concave surface facing toward the object side; and
    a third lens group consisting essentially of a third lens having a negative refractive power and having a convex surface facing toward the object side,
    wherein the aperture stop, the first lens group, the second lens group, and the third lens group are arranged in order from the object side toward an image-plane side.

* * * * *